United States Patent [19]

Fefeu et al.

[11] Patent Number: 5,259,109
[45] Date of Patent: Nov. 9, 1993

[54] MACHINE FOR THE AUTOMATIC FITTING OF PISTON RINGS ONTO PISTONS

[75] Inventors: Michel A. Fefeu, Magny-les-Hameaux; Alfred Schreiber, Aulnay-sous-Bois; Donatus O. Nwokoye, Carrieres sous Bois; Francois G. Charton, Aubergenville, all of France

[73] Assignee: Floquet Monopole, France

[21] Appl. No.: 922,849

[22] Filed: Jul. 31, 1992

[30] Foreign Application Priority Data

Jul. 31, 1991 [FR] France .................. 91 09751

[51] Int. Cl.⁵ .................. B23P 19/08; B23Q 7/10
[52] U.S. Cl. .................. 29/771; 29/809; 29/222; 29/229; 29/235
[58] Field of Search ............ 29/450, 451, 453, 771, 29/809, 222, 229, 235, 269; 221/221, 222, 296, 297, 298

[56] References Cited

U.S. PATENT DOCUMENTS

| | | | |
|---|---|---|---|
| 2,792,625 | 5/1957 | Hoffman | 29/222 X |
| 3,793,695 | 2/1974 | Carter et al. | 29/222 X |
| 4,047,276 | 9/1977 | Albers | 29/222 |
| 4,967,459 | 11/1990 | Garnier | 29/222 |

FOREIGN PATENT DOCUMENTS

| | | |
|---|---|---|
| 55-011773 | 1/1980 | Japan . |
| 55-137849 | 10/1980 | Japan . |
| 56-045339 | 4/1981 | Japan . |
| 63-150119 | 6/1988 | Japan . |
| 63-196328 | 8/1988 | Japan . |
| 196329 | 8/1988 | Japan .................. 29/222 |
| 1425026 | 9/1988 | U.S.S.R. .................. 29/222 |
| 802780 | 10/1958 | United Kingdom . |

Primary Examiner—Timothy V. Eley
Attorney, Agent, or Firm—Larson and Taylor

[57] ABSTRACT

A machine for automatically distributing piston rings and spacers into the grooves of a piston is disclosed. The machine comprises magazine tubes onto which stacks of the spacers and rails are threaded. The machine further comprises a widened bore in which the piston is seated as rails or spacers are automatically released from the tubes and threaded into the piston grooves.

7 Claims, 8 Drawing Sheets

MACHINE FOR THE AUTOMATIC FITTING OF PISTON RINGS ONTO PISTONS

FIELD OF THE INVENTION

The present invention relates to a machine for the automatic fitting of piston rings onto pistons, in particular onto the pistons of internal combustion engines.

BACKGROUND OF THE INVENTION

These may be in particular, but not exclusively, scraper rings of small thickness, each consisting of two split and flat rings which may have a thickness of 4/10th mm, commonly termed "rails", and separated by a spring-ring, also split, of special shape, commonly termed "spacer", these members being constituted of a steel alloy and having, once superimposed and placed into the corresponding groove of the piston, a total thickness on the order of 2 mm. The resilient spacer may have different configurations and may comprise for example, on the radially inward side, a corrugated peripheral step, by virtue of which this spacer, through its radial resilience, exerts an outward radial pressure on the two rails, necessary in order to produce the leak-tightness around the piston when it is placed in its cylinder.

FIGS. 1 through 4 of the accompanying drawings show by way of example the constituent members of such a scraper piston ring.

Figure 1:
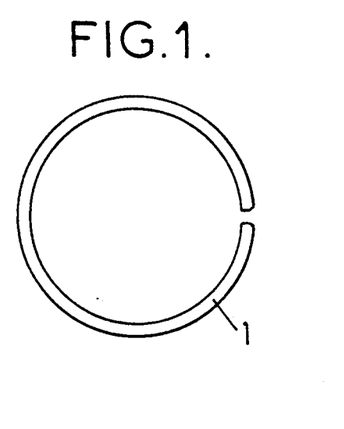
FIG. 1 shows a top view of a rail 1.
Figure 2:
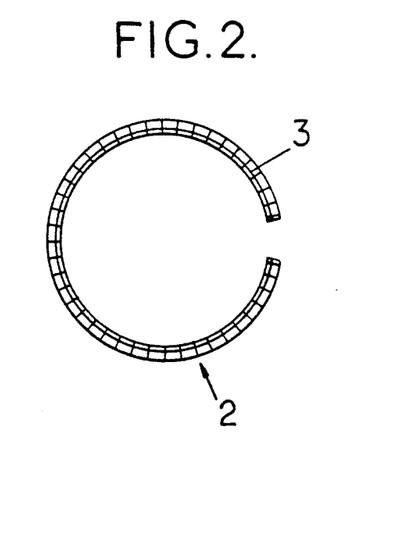
FIG. 2 shows a top view of a spacer 2, with its steps 3.
Figure 3:
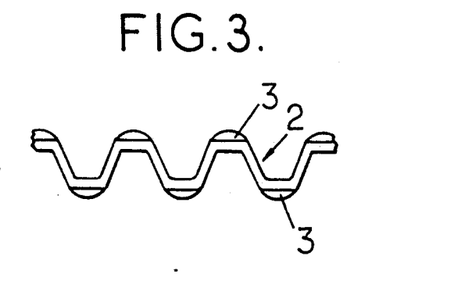
FIG. 3 shows a profile view of spacer 2.
Figure 4:
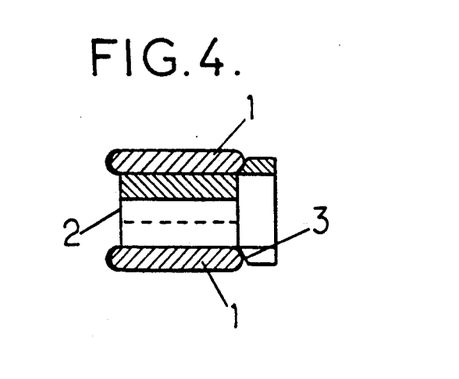
FIG. 4 shows cross sectional view of the scraper piston ring constituted by the stacking of two rails 1 and of a spacer 2.

FIG. 1 shows a rail 1 seen from above and FIG. 2 a spacer 2 also seen from above, with its steps 3, FIG. 3 being a profile view of this spacer 2. FIG. 4 shows in cross section the scraper piston ring constituted by the stacking of two rails 1 and of a spacer 2, the radially outward part of this piston ring corresponding to the left part of the figure. Owing to the small thickness of the rails 1 and the special profile of the spacer 2, their fitting into the grooves of the pistons has hitherto been carried out manually.

SUMMARY OF THE INVENTION

The object of the present invention is to solve the problems which arise when it is desired to produce a machine for the automatic fitting of such piston rings.

Spacers and rails being of very different shapes, as has just been seen, the machine will have specific dispositions in order to permit their sequential insertion into the groove in question of the piston, and these dispositions, both as regards the rails and as regards the spacers, may have a certain number of variants.

With respect firstly to the distribution of the spacers, it will be possible for example to use a machine which comprises a hollow magazine-tube comprising at the end a widened bore terminating on the outside with a bevel and constituting a seating for a piston, so that the piston groove to be equipped is situated in the vicinity of said bevel, onto which tube is threaded a stack of said spacers which can be slid automatically and step by step onto the tube by an axially movable pusher, and wherein there is further provided, on the other side of said stack from said pusher, and in the vicinity of the abovementioned bevel, an axially movable stop adapted to occupy successively two axially offset positions, namely a first position in which it blocks said stack of spacers between it and said pusher, the last spacer of the stack, against which it bears, then bearing radially against said bevel, and a second position in which this stop is separated from said last spacer, thus permitting it to slide onto said bevel and to enter the corresponding groove of said piston by radial tightening.

Preferably, provision is additionally made so that for said second position of said stop, said pusher is also separated from said stack of spacers, so as to permit a slight downward movement of the latter, with the exception of the last spacer so as not to hinder said radial tightening of said last spacer, to be inserted into the groove in question of the piston.

The mode of operation of a machine thus designed will be better understood by reading the following example of an embodiment.

With regard, now, to the rails, to be brought into the same groove of the piston on either side of the spacer just considered, it is proposed that the machine may essentially comprise, for the fitting of the rails into said groove of the piston, on either side of the previously fitted spacer, a magazine-tube onto which is threaded a stack of rails resting on a pusher, said tube being movable vertically along its axis, a set of slides with recesses suitable for sliding in a fixed casing in a direction perpendicular to said axis, and a set of grips which are movable both in the direction perpendicular to said axis and vertically in the direction of this axis, these grips having the function of pushing said rails in turn respectively into the recesses of the slides and of guiding said piston downward when, after they have been brought back up, these grips permit said rails to be released from said slides and to enter said groove of the piston.

Advantageously, the machine may comprise the additional feature that said slides have, just in front of said recesses, sloping thresholds slightly compressing the rails radially inward during the upward movements of said magazine-tube, said recesses being delimited moreover by stops stopping said rails at said recesses.

It will be seen more precisely below how such a machine can be constituted, with other possible dispositions and variants.

BRIEF DESCRIPTION OF THE DRAWINGS

All these embodiments of the invention will now be described as examples which are by no means limitative with reference to the drawings in which.

DESCRIPTION OF THE PREFERRED EMBODIMENT

In FIGS. 5a through 5e a hollow magazine-tube has been referenced 4, and a stack of spacers similar to those of FIGS. 2 and 3 has been referenced 5, these spacers being resiliently distended owing to their engagement onto a tube of diamater slightly greater than their diameter at rest. The tube 4 comprises at its upper end a widened bore 6 terminating on the outside with a bevel 7 and constituting a seating for a piston 8. The depth of the bore 6 is such that the lower wall of the piston groove 9 to be equipped once put into place is located in the region of the upper edge of this bore. The machine additionally comprises an annular and axially movable pusher 10 engaged on the tube 4 underneath the stack 5, and a stop 11, also annular and axially movable, disposed above said stack.

Figures 5A, 5B:
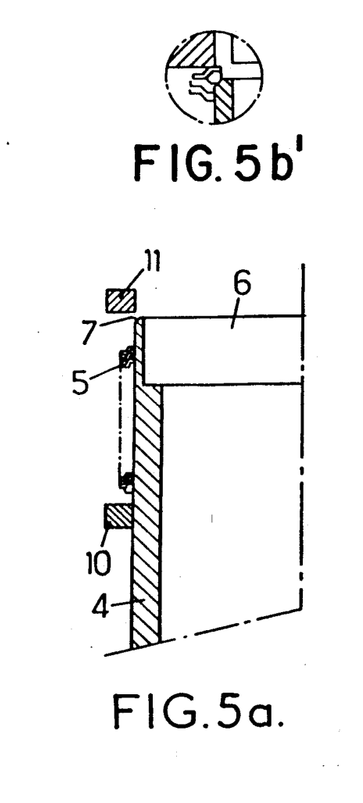
FIGS. 5a through 5e show diagrammatically, in axial half-cross sections, the various phases of operation of the machine, for the fitting of a spacer into a piston groove wherein FIG. 5b' is an enlarged view of the circled portion in FIG. 5b.
Figure 5B:
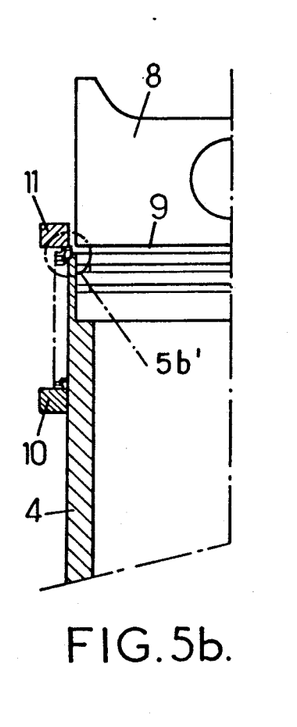
Figure 5C:
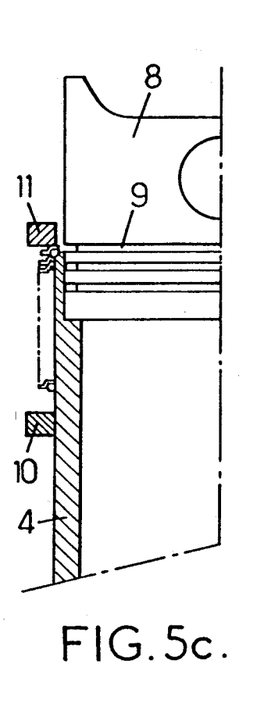

This being so, in the initial position of FIG. 5a, the pusher 10 and the stop 11 are seen to be separated from the stack 5 of the spacers, the stop 11 being in its low position (referred to above as "first position"). A piston 8 is put into place in the bore 6, and then the pusher 10 is pushed upward so as to press the stack 5 between it and the stop 11. The upper spacer 2 then bears radially against the bevel 7 (FIG. 5b). The pusher 10 is then brought back down so that the stack 5 does not block the upper spacer 2, allowing for the corrugated profile of the spacers and for their steps (FIG. 5c).

Figure 5D:
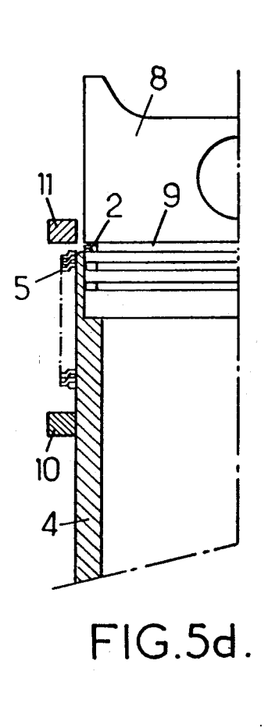
Figure 5E:
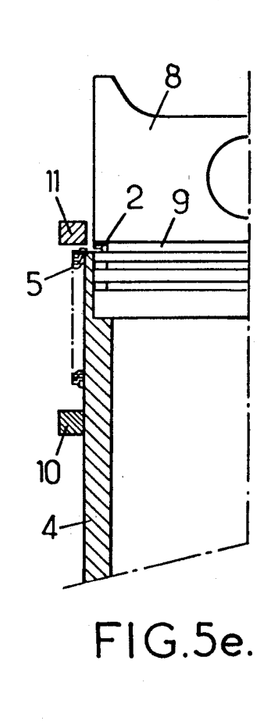

Next the stop 11 is brought into its high position (second position), which permits the spacer 2 bearing radially against the bevel 7 to slide upward on the latter, because of its spring effect, and to enter the corresponding groove 9 of the piston 8 (FIG. 5d). All these movements are of course performed automatically and as rapidly as possible.

Lastly, the stop 11 is brought back down into its first position, the piston 8 is removed in order to go to the position for fitting the rails 1 (FIG. 5e), and the initial state of FIG. 5a is re-established.

FIGS. 6a through 6f show the part of the machine which is designed to fit the rails 1 on either side of the spacer 2 already fitted into the groove 9 of the piston 8.

This part of the machine comprises: a hollow magazine-tube 13 which is movable vertically along its axis 14, and also in rotation about this axis, this tube 13 being arranged so as to ensure the axial positioning of the piston 8; a fixed casing 15 in which a certain number of slides 16 (at least two) can slide; and a certain number of expansible grips 17 (at least two) capable of moving both axially and perpendicularly to the axis 14, these grips 17 being arranged so as to ensure the opening and the release of the rails 1, and also to ensure the centering of the piston 8.

Figure 6A:
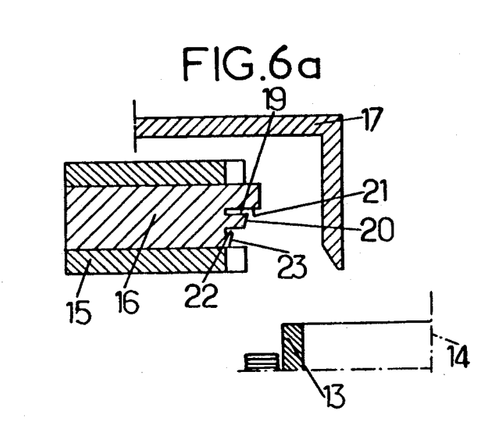
FIGS. 6a through 6f show diagrammatically in axial half-cross sections, the various phases of operation of the machine, for fitting two rails, on either side of the spacer already fitted, in said groove.

A stack 12 of rails 1 being threaded without stress onto the magazine-tube 13 and being carried by a pusher 18, the operation of this system is as follows:

the slides 16 advance toward the axis 14, as do the grips 17, which also have a downward movement (FIG. 6a). The magazine-tube 13 and its pusher 18 rise, bringing the stack 12 of the rails into the position shown in FIG. 6b. The upper rail 1 of the stack 12 can be seen to enter a first recess 19 of the slide 16, after having crossed a sloping threshold 20 of the slide 16 (while being momentarily compressed) and after having been stopped by a stop 21 of the slide 16. Next the magazine-tube 13 and its pusher 18 descend (FIG. 6c), and the magazine-tube 13 pivots through 180° on its axis 14 so that the slot of the next rail 1 is diametrically opposed to that of the preceding rail, given that in the stack 12 the slots of the rails are as a rule all aligned.

Figure 6B:
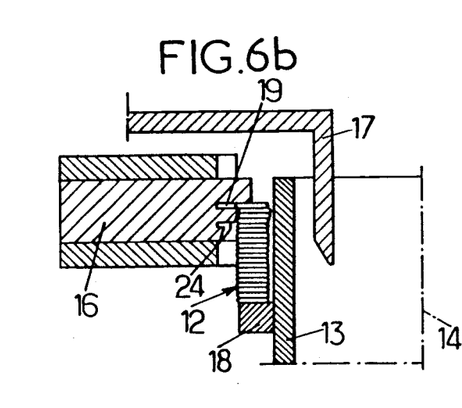
Figure 6C:
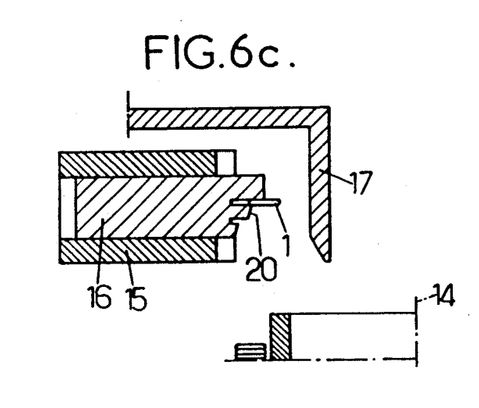
Figure 6D:
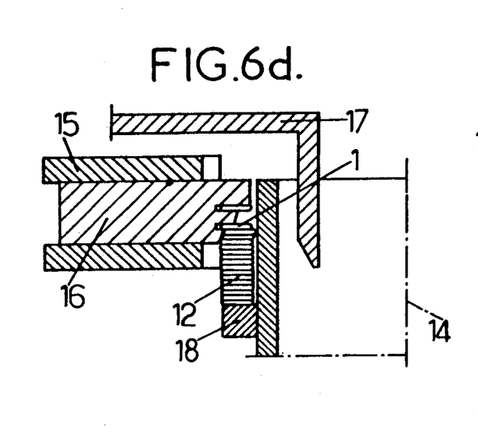
Figure 6E:
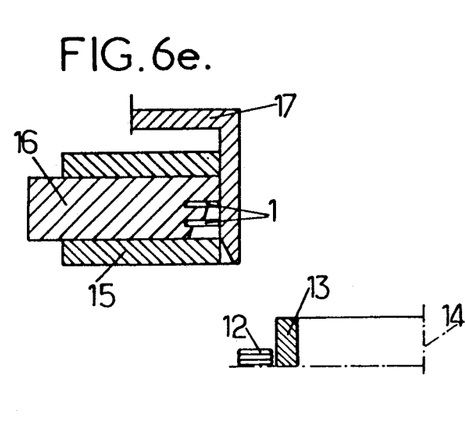
Figure 6F:
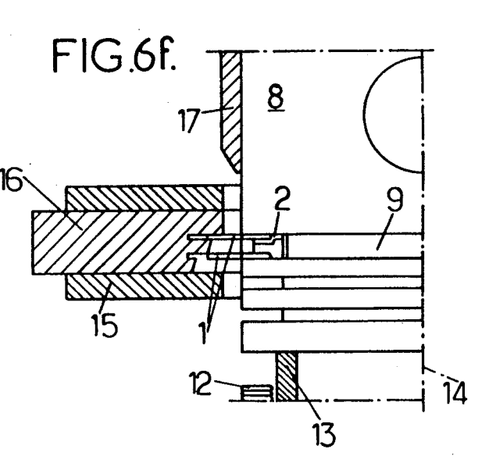

Next, the magazine-tube 13 and its pusher 18 move back up (FIG. 6d) and the same operation as that of FIG. 6b is reproduced for the next rail 1 of the stack (second recess 22 of the slide 16, sloping threshold 23, stop 24, all operating in the same manner). The slide 16 is thus equipped with two rails 1. The magazine-tube 13 and its pusher 18 then move back down once again, and the grips 17 move back, as do the slides 16, so as to drive the rails 1 into the recesses 19 and 22 of the slides 16 (FIG. 6e). After which it is sufficient to cause the piston 8 to descend, guided by the grips 17, until it is stopped against the top of the magazine-tube 13, and then to cause the two rails 1 to enter the groove 9, on either side of the spacer 2 fitted previously (FIG. 6f). In order to do this it is sufficient to cause the grips 17 to move back up, which releases the rails 1 from the slides 16 and allows them to enter the groove 9.

A complete machine will now be described implementing either some of the dispositions which have just been described, in particular for the spacers, or other dispositions, in particular in order to carry out the fitting of the rails.

The general principle of this machine resides in that it comprises mainly:

a feed system consisting of two distributors for the rails 1, with simultaneous separation and feed, and of a distributor for the spacer 2, separation of spacers being performed separately from feeding of spacers;

a fixed casing B for receiving the piston ring members and the piston, comprising housings h receiving the rails 1 and spacers 2 of the piston ring and ensuring their positioning before assembly with the aid of sliding stops, slides t being provided for each rail and spacer;

a system of expansible and sliding grips 47 ensuring the opening and the release of the members 1, 2 of the piston ring as well as the centering of the piston 8; and a sliding plate 60 ensuring the successive positionings of the piston 8 at the time of the release of each piston-ring member 1, 2 into the groove 9 of the piston.

There may be, for example, four expansible grips, three housings 1 and four slides t for each member 2, $1_1$ or $1_2$.

With reference to FIGS. 7a through 7f the system for separating and distributing the spacers 2 will firstly be described.

The separation of the last spacer 2 from a stack 35 is carried out by means of the following members: a magazine-tube 34 onto which the spacers 2 are threaded; a fixed annular stop 41 ensuring the positioning of the end spacer 2; and a pusher 40 which is movable axially along the tube 34 (by analogy with the system of FIGS. 5a through 5e, the same references, increased by 30, have been given to similar members—except for the spacers 2).

For the distribution of the spacers 2 in the abovementioned casing B (which will be seen later), the system comprises a platform P for receiving the spacer 2 after separation, and a pusher p.

Figure 7A:
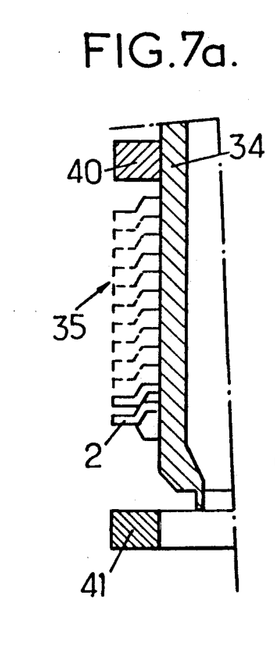
FIGS. 7a through 7f show diagrammatically in axial half-cross sections, another system for separating and for distributing spacers in another type of machine according to the invention.
Figure 7B:
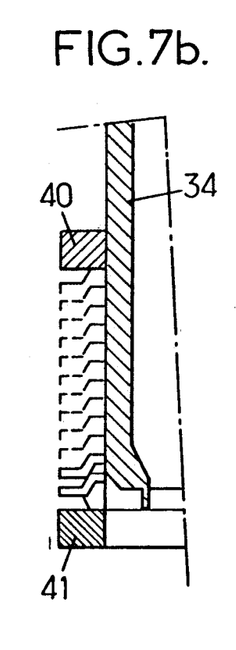
Figure 7C:
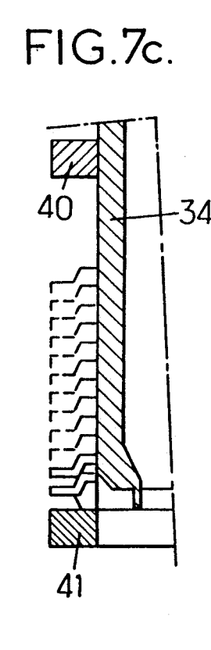

The operation of the device is as follows:

The initial state being that of FIG. 7a, the pusher 40 descends and pushes the stack 35 of the spacers against the fixed stop 41 (FIG. 7b). The pusher 40 moves back up (FIG. 7c).

Figure 7D:
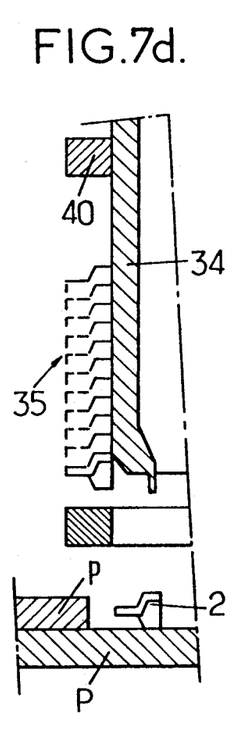
Figure 7E:
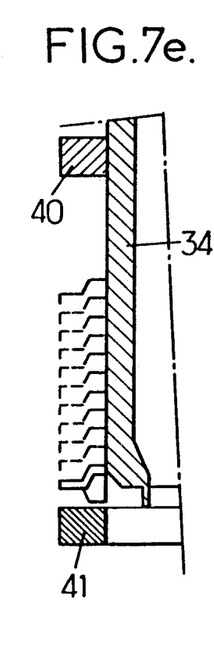
Figure 7F:
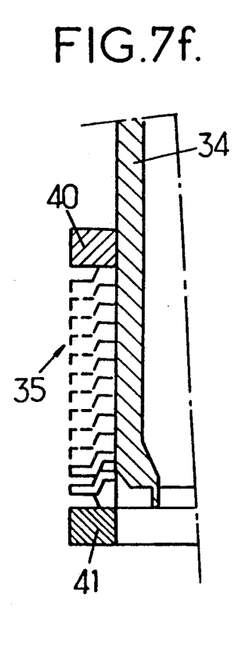

The magazine-tube 34 rises, which releases the last spacer 2, which falls onto the platform P; the pusher p inserts it into the casing (FIG. 7d). Next, the tube 34 moves back down (FIG. 7e) and the position of FIG. 7b is restored (FIG. 7f). The process is then repeated in the same manner for the following spacers.

Figure 8A:
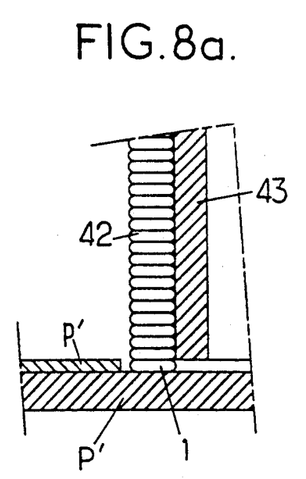
FIGS. 8a through 8c describe diagrammatically the mode of distribution of the rails.
Figure 8B:
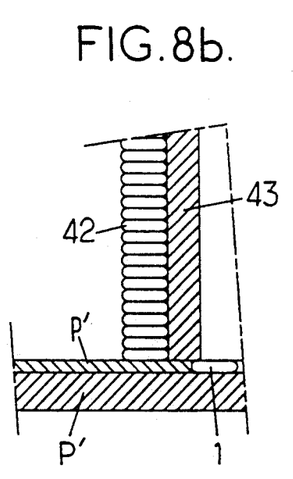
Figure 8C:
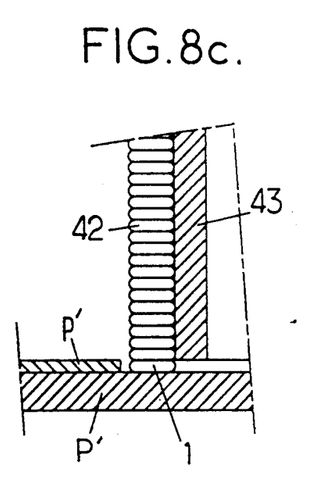

For the distribution of the rails 1, two magazine-tubes 43 are used (FIGS. 8a through 8c) which may be diametrically opposed with respect to the center of the casing B and on which the stacks 42 of rails 1 are threaded, without any stress. Two platforms P' receive the last rail 1, and the latter, at the lower part of each of the magazine-tubes 43, is put into position by a pusher p'. Starting from the initial state in FIG. 8a, the pusher p' pushes the last rail 1 into the casing B (FIG. 8b) and then the next rail 1 descends by gravity onto the platform P' (FIG. 8c).

It should be noted that, since the upper groove 9 of the piston 8 is beveled at its lower part, the following order should be observed for the insertion of the rails 1 and spacers 2 of the piston ring: spacer 2, upper rail 1 (above the spacer), lower rail $1_2$ (underneath the spacer). Consequently, the abovementioned three members are disposed in the casing B as follows: spacer 2 on top, upper rail $1_1$ in the middle, lower rail $1_2$ underneath.

This being so, the general operation of the machine will be described below with reference to FIGS. 9 through 15.

In all these figures, the piston always has the reference 8, and the groove to be equipped with a piston ring, 9. The four expansible and sliding grips are referenced 47; they are movable horizontally by means of jacks 62 which are themselves movable vertically by means of jacks 63. The reference 60 is given to a sliding plate suitable for moving vertically under the action of a jack 61.

Figures 9, 10, 11:
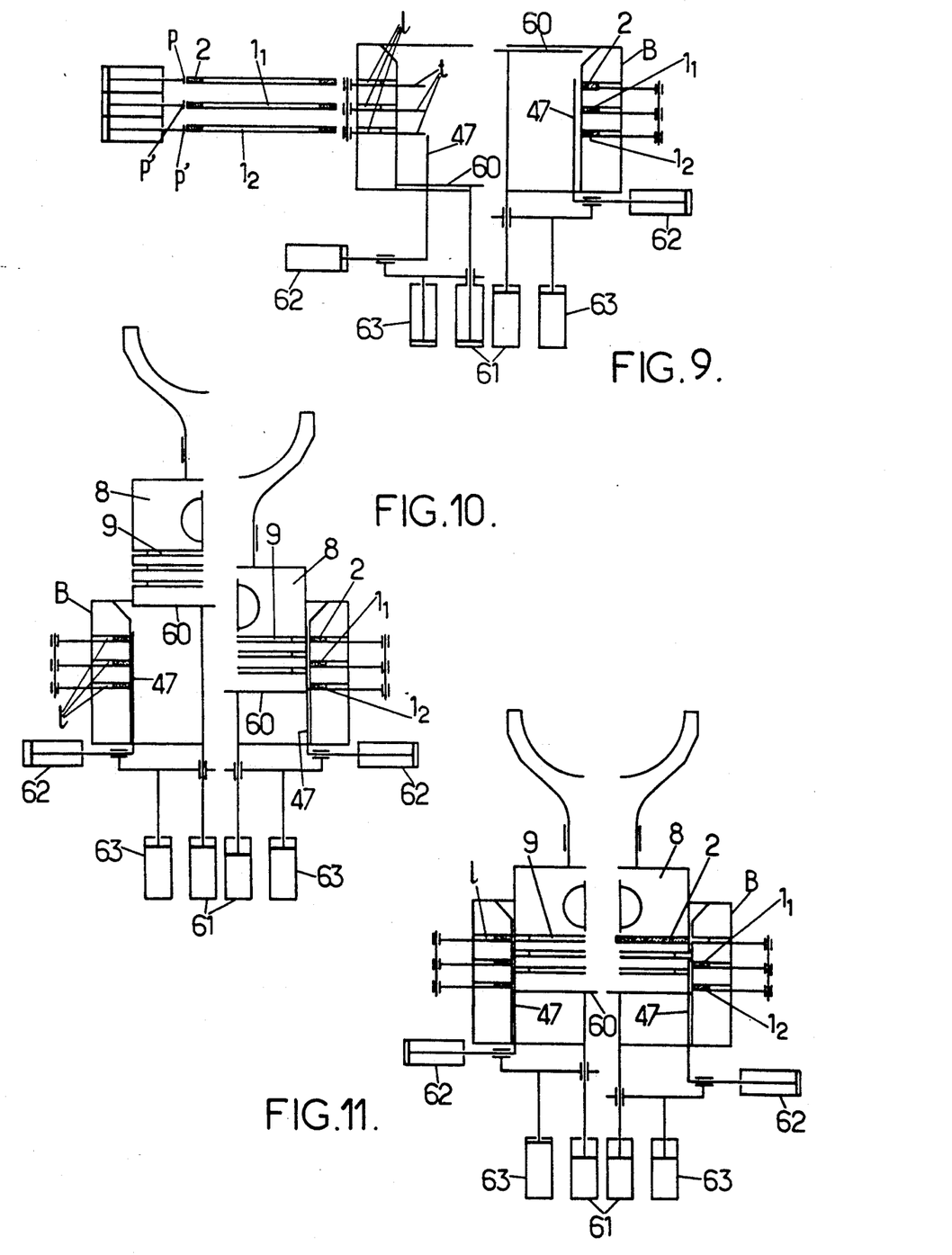
FIGS. 9 through 15 show the various phases of operation of the machine, in diagrammatic views.

FIG. 9 shows the casing B being fed with members 2, $1_1$ and $1_2$. In this figure, as in the following figures, the left half shows the initial state of the various movable parts, and the right half their final state, which each time constitutes the initial state of the next phase of operation. In the initial state of FIG. 9, the three members 2, $1_1$ and $1_2$ of the piston ring are on their respective thrust platforms P and P'; the slides t are closed, as are the grips 47, which are then in the low position. The plate 60 is also in the low position, underneath the slides t.

The members 2, $1_1$ and $1_2$ are pushed simultaneously into the casing B, the grips 47 rise as far as the spacer 2 and separate radially outward, as do the slides t. The plate 60 rises as far as the upper level of the casing B. Thus the members 2, $1_1$ and $1_2$ are in their respective housings 1 and are expanded. New members are distributed, on the platforms P and P'.

Next, (FIG. 10) the piston 8 is brought down onto the plate 60 and descends with it (jacks 61), guided by the grips 47. The plate 60 is stopped precisely in a position in which its groove 9 comes to the level of the spacer 2.

The grips 47 descend (FIG. 11) until they are below the upper housing 1, which permits the automatic insertion of the spacer 2 into the groove 9.

Figure 12:
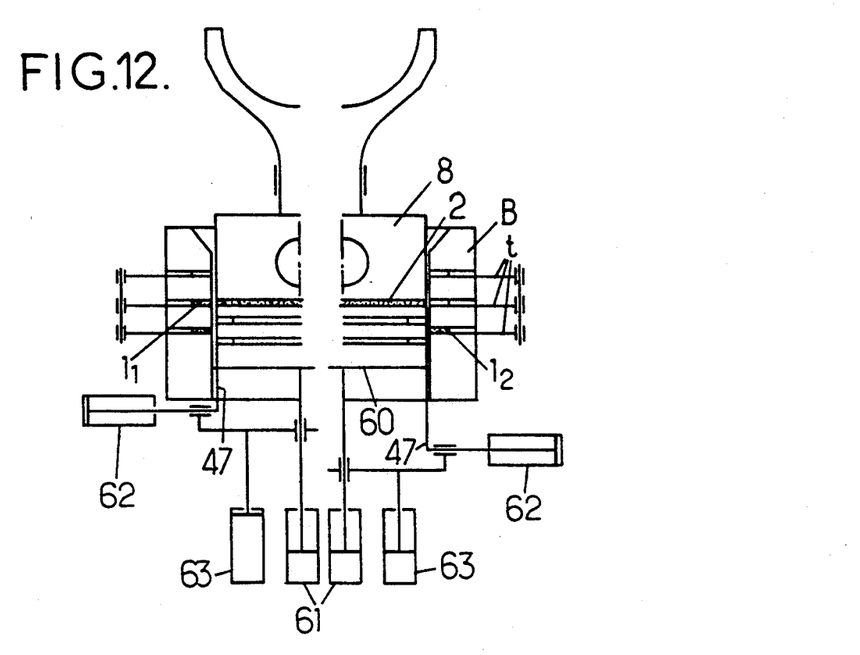

The grips 47 are then brought back up so as to re-center the spacer 2 on the piston 8; the plate 60 is lowered and stopped precisely, as are the grips 47, into a position for which the upper rail $1_1$ can be released into the groove 9 of the piston, above the spacer 2 (FIG. 12).

Figure 13:
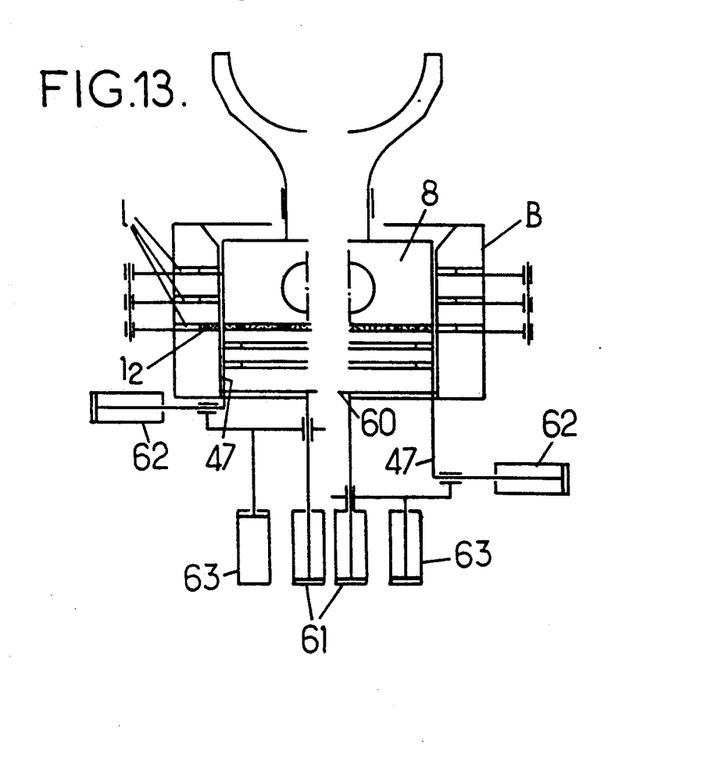
Figure 14:
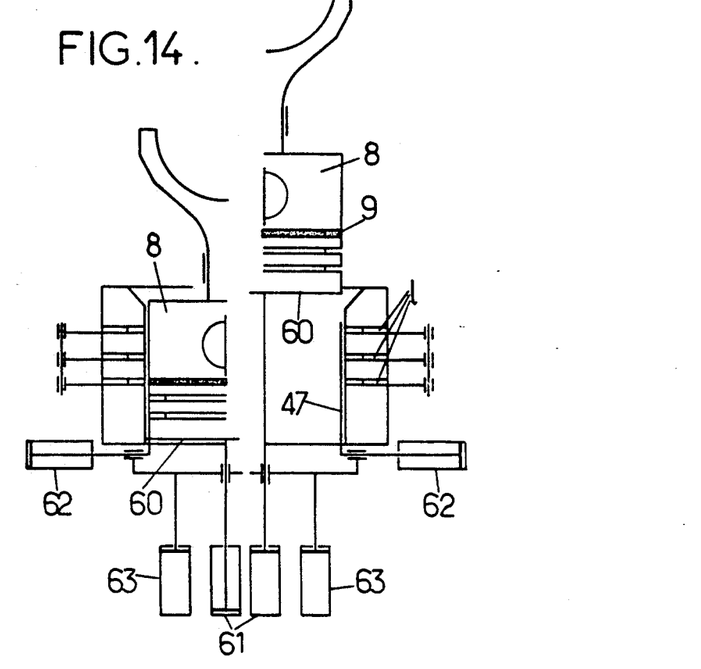
Figure 15:
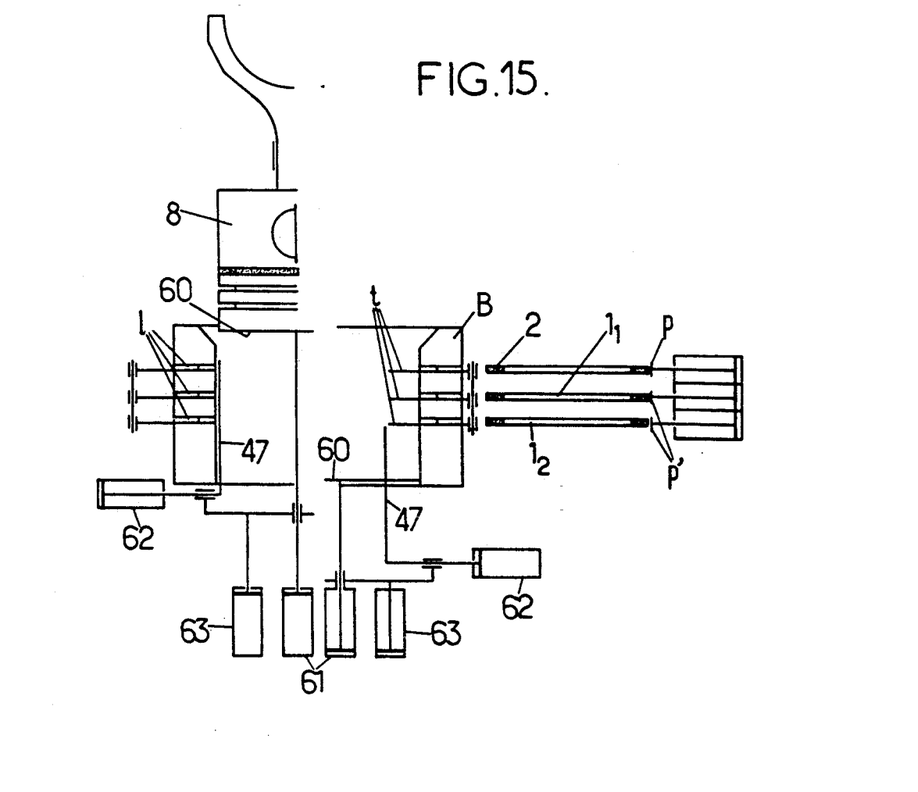

As previously, the grips 47 are raised above the rail $1_1$ so as to re-center it, as well as the spacer 2, on the piston 8, after which the plate 60 is lowered, as are the grips 47, into a position for which the second rail $1_2$ can be released into the groove 9, underneath the spacer 2. The complete piston ring is then in place on the piston 8 (FIG. 13).

The grips 47 are raised once again so as to center this piston ring on the piston. The plate 60 is then caused to rise and the piston 8, and the latter, with its rod, is removed. In this final state (right half of FIG. 14), the grips 47 are separated and in the high position, the slides t are mutually separated. From the initial state of FIG. 15, the plate 60 and the grips 47 are lowered again, the grips and the slides t are closed again and the initial state of FIG. 9 is restored.

We claim:

1. A machine for automatically fitting piston rings onto pistons, the rings comprising two rails stepped, on a radially inward side, by a spacer interposed between the rings, the machine comprising a hollow magazine tube for the insertion of the spacers into piston grooves, the hollow magazine-tube having a widened bore and an outside portion with a bevel at one end, the bore comprising a seating for a piston for situating said piston grooves near the bevel, the machine further comprising an axially movable pusher for automatically threading a stack of the spacers onto the tube and wherein there is further provided, on a side of the stack opposite the pusher and near the bevel, an axially movable stop adapted to successively occupy two axially offset positions, a first of the positions comprising the stack of spacers between the stop and the pusher, a last of the spacers in the stack bearing radially against the bevel, and a second of the positions comprising a separation between the stop and the last spacer whereby the last spacer is able to slide onto the bevel and to enter one of the piston grooves by radial tightening.

2. The machine according to claim 1 wherein the second position further comprises a separation between the pusher and the stack of spacers, whereby a slight downward movement of all the spacers except the last spacer is permitted such that the radial tightening of the last spacer is not hindered.

3. The machine according to claim 1 further comprising a second magazine-tube onto which is threaded a stack of rails resting on a pusher, the second tube being movable vertically along its axis, a set of slides with recesses suitable for sliding in a fixed casing in a direction perpendicular to the axis, and a set of grips which are movable both in a direction perpendicular to the axis and vertically in a direction parallel to the axis, the grips being capable of successively pushing the rails into the recesses of the slides and being capable of guiding the piston downward after the rails have been released from the slides and entered the grooves of the piston.

4. The machine as claimed in claim 3 wherein a portion of each of the slides in front of the recesses comprises a sloping threshold slightly compressing the rails radially inward during the upward movements of the magazine-tube, the recesses being delimited by stops for stopping the rails at the recesses.

5. A machine for the automatic fitting of piston rings comprising rails and spacers onto pistons, the machine comprising:
a feed system comprising two distributors for simultaneous separation and feed of rails and a distributor for spacers;
a fixed casing for receiving piston rings and a piston, comprising housings for receiving the piston rings and ensuring their positioning before assembly by means of sliding stops, slides being provided for each member;

a system of expansible and sliding grips for opening and releasing the piston rings and centering the piston; and a sliding plate for positioning the piston when a rail or a spacer is released into a groove of the piston.

6. The machine as claimed in claim 5, wherein the distributor for the spacers comprises a magazine-tube onto which the spacers are threaded, a fixed annular stop for positioning of an end spacer, and a pusher which is movable axially along the tube, the tube comprising a beveled portion followed by a portion of narrowing diameter, whereby the end spacer is centered.

7. The machine as claimed in claim 5, further comprising means for synchronizing closure and separation of the grips respectively with closure and separation of the slides.

* * * * *